(12) United States Patent
Gillblad et al.

(10) Patent No.: US 9,973,971 B2
(45) Date of Patent: May 15, 2018

(54) METHODS, NODES AND SYSTEM FOR ENABLING REDISTRIBUTION OF CELL LOAD

(71) Applicant: Telefonaktiebolaget LM Ericsson (publ), Stockholm (SE)

(72) Inventors: Daniel Gillblad, Åkersberga (SE); Olof Görnerup, Stockholm (SE); Diarmuid Corcoran, Stockholm (SE); Tomas Lundborg, Hässelby (SE); Andreas Ermedahl, Spånga (SE); Per Kreuger, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 43 days.

(21) Appl. No.: 15/318,259

(22) PCT Filed: Jun. 26, 2014

(86) PCT No.: PCT/SE2014/050790
§ 371 (c)(1),
(2) Date: Dec. 12, 2016

(87) PCT Pub. No.: WO2015/199591
PCT Pub. Date: Dec. 30, 2015

(65) Prior Publication Data
US 2017/0134984 A1    May 11, 2017

(51) Int. Cl.
*H04W 4/00*    (2018.01)
*H04W 28/08*   (2009.01)
(Continued)

(52) U.S. Cl.
CPC ....... *H04W 28/08* (2013.01); *H04W 36/0083* (2013.01); *H04W 36/22* (2013.01)

(58) Field of Classification Search
None
See application file for complete search history.

(56) References Cited

U.S. PATENT DOCUMENTS

| | | | |
|---|---|---|---|
| 2006/0105774 A1* | 5/2006 | Ranta-Aho | H04L 47/10 455/453 |
| 2009/0088080 A1* | 4/2009 | Zhang | H04W 72/0486 455/63.1 |

(Continued)

FOREIGN PATENT DOCUMENTS

| | | |
|---|---|---|
| EP | 1 699 178 A1 | 9/2006 |
| WO | WO 2012/171574 A1 | 12/2012 |

OTHER PUBLICATIONS

International Search Report and Written Opinion of the International Searching Authority, International Application No. PCT/SE2014/050790, dated Mar. 11, 2015.

(Continued)

*Primary Examiner* — Farah Faroul
(74) *Attorney, Agent, or Firm* — Sage Patent Group

(57) ABSTRACT

The present invention relates to a method and system for enabling a redistribution of load between cells. The method comprises obtaining a current load value for a first cell, and obtaining a target load value for a neighbor cell. The method also comprises determining the target load value for the first cell as a function of the current load value and the target load value for the neighbor cell, obtaining an update of the target load value for the neighbor cell, and iterating the determining and the obtaining. The method further comprises taking action for a redistribution of load between the first cell and the neighbor cell towards a load distribution represented by the resulting load values.

24 Claims, 10 Drawing Sheets

(51) Int. Cl.
*H04W 36/22* (2009.01)
*H04W 36/00* (2009.01)

(56) References Cited

U.S. PATENT DOCUMENTS

| | | | |
|---|---|---|---|
| 2013/0324076 A1 | 12/2013 | Harrang | |
| 2015/0141028 A1* | 5/2015 | Zhou | H04W 24/08 455/452.1 |
| 2015/0263818 A1* | 9/2015 | Guo | H04L 5/0073 370/329 |

OTHER PUBLICATIONS

3GPP, Technical Specification—"3rd Generation Partnership Project; Technical Specification Group Radio Access Network; Evolved Universal Terrestrial Radio Access Network (E-UTRAN); X2 application protocol (X2AP) (Release 12)", 3GPP TS 36.423 V12.0.0 (Dec. 2013), 144 pp.

Andrews, "Seven Ways that HetNets Are a Cellular Paradigm Shift", *IEEE Communications Magazine*, Mar. 2013, pp. 136-144.

Fotiadis et al., "Multi-Layer Mobility Load Balancing in a Heterogeneous LTE Network", *2012 IEEE Vehicular Technology Conference (VTC Fall)*, Sep. 3-6, 2012, 5 pp.

Kreuger et al., "zCap: a zero configuration adaptive paging and mobility management mechanism", *International Journal of Network Management*, vol. 23, No. 4, Jul./Aug. 2013, pp. 235-258.

Siomina et al., "Load Balancing in Heterogeneous LTE: Range Optimization via Cell Offset and Load-Coupling Characterization", *2012 IEEE International Conference on Communications (ICC)*, Jun. 10-15, 2012, pp. 1357-1361.

Wang et al., "Dynamic Load Balancing and Throughput Optimization in 3GPP LTE Networks" *The International Wireless Communications and Mobile Computing Conference (IWCMC '10)*, Caen, France, Jun. 28-Jul. 2, 2010, pp. 939-943.

* cited by examiner

METHODS, NODES AND SYSTEM FOR ENABLING REDISTRIBUTION OF CELL LOAD

CROSS REFERENCE TO RELATED APPLICATION

This application is a 35 U.S.C. § 371 national stage application of PCT International Application No. PCT/SE2014/050790, filed on Jun. 26, 2014, the disclosure and content of which is incorporated by reference herein in its entirety. The above-referenced PCT International Application was published in the English language as International Publication No. WO 2015/199591 A1 on Dec. 30, 2015.

TECHNICAL FIELD

The disclosure relates to load balancing in a wireless communication network, and more specifically to a system, to radio network nodes; and to methods performed in the system and in the radio network nodes for enabling redistribution of load between cells of the wireless communication network.

BACKGROUND

3GPP Long Term Evolution (LTE) is the fourth-generation mobile communication technologies standard developed within the 3$^{rd}$ Generation Partnership Project (3GPP) to improve the Universal Mobile Telecommunication System (UMTS) standard to cope with future requirements in terms of improved services such as higher data rates, improved efficiency, and lowered costs. The Universal Terrestrial Radio Access Network (UTRAN) is the radio access network of a UMTS and Evolved UTRAN (E-UTRAN) is the radio access network of an LTE system. In an E-UTRAN, a User Equipment (UE) is wirelessly connected to a Radio Base Station (RBS) commonly referred to as an evolved NodeB (eNodeB or eNB) in LTE. An RBS is a general term for a radio network node capable of transmitting radio signals to a UE and receiving signals transmitted by a UE. The eNodeB is a logical node in LTE and the RBS is a typical example of a physical implementation of an eNodeB. A UE may more generally be referred to as a wireless device or a wireless terminal.

FIG. 1 illustrates a part of an LTE system. In the Radio Access Network (RAN) an eNodeB 101 serves a UE 103 located within the eNodeB's geographical area of service or the cell 111. The eNodeB 101 is connected via an X2 interface to a neighboring eNodeB 102 serving another cell 112. The two eNodeBs 101 and 102 are connected to a core network node called Mobility Management Entity (MME) 104. The core network in LTE is sometimes referred to as Evolved Packet Core (EPC), and the MME is one of the core network nodes in EPC. Together, the E-UTRAN, the EPC and potentially other entities too, such as service related entities, are referred to as the Evolved Packet System (EPS). S1 Application Protocol (AP) provides the signaling service between E-UTRAN and EPC.

A homogeneous network is a RAN comprising network nodes, such as RBS, eNodeB, Remote Radio Heads (RRH), and Remote Radio Units (RRU), in a planned layout. In the homogeneous network all network nodes have similar transmit power levels, antenna patterns, and receiver noise floors, as well as similar backhaul connectivity to a data network. A Heterogeneous Network (HetNet) is a RAN comprising several different types of network nodes serving the cells. The types of network nodes are different with respect to, for example, transmission power, radio bandwidth, backhaul capacity, and placement. These different types of network nodes interact to provide network access and communication services to a set of wireless terminals or UEs. In one example of a HetNet, low power nodes such as micro, pico, femto, or relay base stations are deployed in addition to a planned or regular placement of high power nodes such as wide area RBSs serving macro cells. Such low power nodes are often deployed to eliminate coverage holes in the homogeneous network and to improve capacity in hot-spots. Due to their lower transmit power and smaller physical size, low power nodes can offer flexible site acquisitions.

In HetNets, the traditional mechanism used to allocate UEs to cells, based on a relative Signal to Interference plus Noise (SINR) for candidate cells at the UE's location, is insufficient. Cells served by low power nodes are expected to off-load the cells served by high power nodes for relatively stationary UEs with a high bandwidth demand. However, their transmission power is generally not sufficient to dominate in terms of relative SINR over the signals transmitted by adjacent high power nodes with higher transmit power. This may be true even for UEs that are quite close to the low power node.

The prevalent solution for this problem in currently deployed systems is to manually configure a range expansion offset parameter based on an expected network load in a given area. This may be feasible for situations where load, node placement, and interference are fairly static. However, this will not be the case in many future scenarios. Low power nodes may e.g. be added without much planning or network operator control over exact placement and UE traffic demand. Furthermore, UE mobility may vary widely on both shorter and longer time scales. Therefore, manually configuring e.g. range expansion offset parameters of networks in such scenarios may not be a viable alternative.

Load balancing for cellular networks has been fairly well studied, where the general idea to base balancing on measurements of the current load distribution in the network is known. In "I. Siomina and Di Yuan, *Load balancing in heterogeneous LTE: Range optimization via cell offset and load-coupling characterization. In Communications (ICC)*, 2012 *IEEE International Conference*, pages 1357-1361, June 2012" a method is described which is based on integer programming to assign offset values to each node, given load levels of the entire network. A drawback of the method is that it needs to be centralized and requires collecting and transferring load estimates to a central location. A time-consuming optimization mechanism is then used to determine suitable values for the offset parameter, which only then can be redistributed to the nodes of the network. It is unclear how the delays and scalability issues implied by such a mechanism should be handled. Similar issues arise in an approach described in "Hao Wang, Lianghui Ding, Ping Wu, Zhiwen Pan, Nan Liu, and Xiaohu You; *Dynamic load balancing and throughput optimization in 3gpp LTE networks; In Proceedings of the 6th International Wireless Communications and Mobile Computing Conference, IWCMC '10*, pages 939-943, New York, N.Y., USA, 2010; ACM". Also this approach is centralized. It uses enforced handovers rather than adapting range expansion offset parameters.

The proposal described in "P. Fotiadis, M. Polignano, D. Laselva, B. Vejlgaard, P. Mogensen, R. Irmer, and N. Scully. *Multi-layer mobility load balancing in a heterogeneous LTE network. In Vehicular Technology Conference (VTC Fall)*, 2012 *IEEE*, pages 1-5, September 2012" uses an estimate of the remaining available capacity of each node to assign offset values for pairs of nodes based on interactions between eNodeBs on the X2 interface, specifically the S1 TNL Load Indicator and the Composite Available Capacity (CAC) messages. The load indicator is very coarse comprising only two bits. The load indicator is in the proposal only used to determine which nodes should participate in the balancing negotiations. Locally determined CAC values are calculated using a fixed target load value for each node. Pairwise offset values are then computed by scaling CAC ratios with operator specific parameters. Using fixed target load implies an imperfect adaption to variations in load distributions. Furthermore, a separate heuristic is employed to determine when and for which nodes the proposed mechanism should be triggered. The simulations described in the disclosure does not model UE mobility and use only constant UE traffic demands, and does thus not take realistic traffic variations or UE mobility patterns into account.

SUMMARY

It is therefore an object to address some of the problems outlined above, and to provide a solution for improved load balancing between cells of a wireless communication network. This object and others are achieved by the methods, the system and the radio network nodes according to the independent claims, and by embodiments according to the dependent claims.

In accordance with a first aspect, a method performed in a system of a wireless communication network for enabling a redistribution of load between cells of the wireless communication network is provided. The method comprises obtaining a value of a current load for a first cell, and obtaining a value of a target load for a neighbor cell of the first cell. The method also comprises determining a value of the target load for the first cell as a function of the value of the current load and the value of the target load for the neighbor cell, obtaining an update of the value of the target load for the neighbor cell, and iterating the determining of the value of the target load for the first cell, and the obtaining of the update of the value of the target load for the neighbor cell. The method further comprises taking action for a redistribution of load between the first cell and the neighbor cell towards a load distribution represented by the iterated determined value of the target load for the first cell and the iterated obtained update of the value of the target load for the neighbor cell.

In accordance with a second aspect, a system of a wireless communication network for enabling a redistribution of load between cells of the wireless communication network is provided. The system is configured to obtain a value of a current load for a first cell, and obtain a value of a target load for a neighbor cell of the first cell. The system is further configured to determine a value of the target load for the first cell as a function of the value of the current load and the value of the target load for the neighbor cell. The system is also configured to obtain an update of the value of the target load for the neighbor cell, and iterate the determining of the value of the target load for the first cell, and the obtaining of the update. The system is further configured to take action for a redistribution of load between the first cell and the neighbor cell towards a load distribution represented by the iterated determined value of the target load for the first cell and the iterated obtained update of the value of the target load for the neighbor cell.

An advantage of embodiments is that an automatic and dynamic redistribution of load in the network is achieved, which allows for improved system performance when the load conditions vary while minimizing manual reconfigurations.

Another advantage of embodiments is that a distributed and localized implementation is provided, thus avoiding delay and scalability issues.

Other objects, advantages and features of embodiments will be explained in the following detailed description when considered in conjunction with the accompanying drawings and claims.

DETAILED DESCRIPTION

Figure 1:
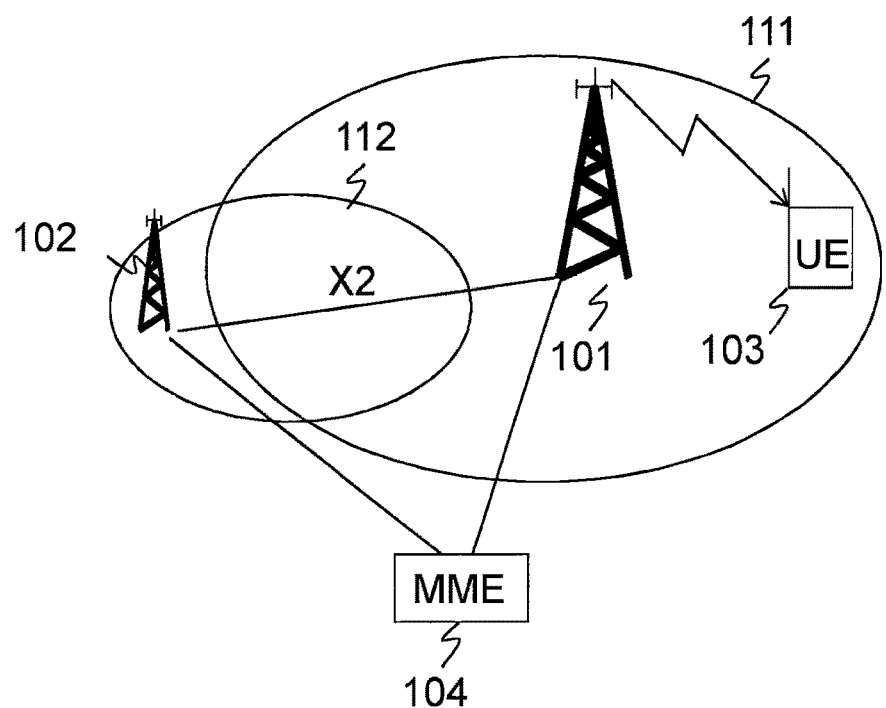
FIG. 1 is a schematic illustration of an LTE wireless communication network in which the present invention may be applied.

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Embodiments are described in a non-limiting general context in relation to a distributed example scenario in an LTE HetNet, where tuning of a range expansion offset parameter is used to control the redistribution of load between cells. However, it should be noted that the embodiments may be applied to any network technology and network architecture. Furthermore, other mechanisms for controlling the redistribution of load are possible, such as tuning of downlink transmission power and tuning of antenna beam forming parameters. The load may be represented by e.g. physical resource block usage, radio channel usage, backhaul link capacity utilization, or computational load. It should be noted that any combination, e.g. maximum or weighted sum, of such load measures could be used as the load value in embodiments of the invention. In the distributed example scenario used to describe the embodiments of the invention, the method is performed in one or more radio network nodes of the wireless communication network serving the cells over which the load is redistributed. However, a centralized or partially centralized implementation is also possible. The method may e.g. be performed in the MMEs of the core network, communicating with the radio network nodes serving the cells over which load is redistributed, or in a central node communicating with more than one MME.

In embodiments of the invention, delay and scalability problems related to centralized solutions for load balancing in wireless networks are addressed by a localized solution where target loads for cells are dynamically determined using a method that potentially involves all nodes. Furthermore, performance under varying load conditions is improved due to the dynamic determination of the target loads. Embodiments of the invention may be localized in the sense that the decision of how to redistribute load is left in the hand of each node, albeit after exchanges of information with other nodes in its proximity.

In embodiments, a distributed on-line mechanism autonomously determines target load values for each cell of an involved node based on the load situation in the cell environment. The target load value of each cell is set to the average of its current load estimate and the target load values in its neighbor cells. Another function than the average function of current load and target load values may also be used, such as a function taking an average of a selection of the most highly loaded cells. The difference or ratio between the determined target load values and estimates of actual load values may then be used to redistribute and balance load within the network towards a load represented by the determined target load values.

Once target loads have been determined, several ways to use this information to achieve improved load balance may be envisioned. Hereinafter, one particular example embodiment will be used to describe how to achieve load balancing or redistribution based on the determined target loads. In this particular example embodiment, a value of a bias parameter is used when calculating relative SINR values reported by the UEs in connection with handover decisions. In LTE, such a mechanism is provided in the form of a range expansion offset, which is associated with each cell or pair of cells. The range expansion offset is intended to bias the SINR calculation performed by the UEs towards low power nodes or as in embodiments of the invention towards less loaded nodes. The calculated target loads may thus be used to dynamically tune range expansion offsets of a cell in this particular embodiment of the invention.

In one embodiment of the invention, a list representing a neighborhood of cells to and from which handovers are made, i.e. potential source and target cells for handovers, is created and dynamically updated in the network node. Each network node will query neighbor nodes for target load values of their cells. Each node may then set its own cell's target load value to e.g. an average of the neighbor cells' target load values and the estimate of its own cell's current load value. Since the target load values of adjacent or neighbor cells will in general be mutually dependent, this type of calculation will have to be iterated until a local equilibrium is reached. In embodiments of the invention, the determining of the target load values converges under stable conditions, and adapts quickly and robustly under realistic variations of load and UE mobility.

One particularly attractive property of embodiments is that, as long as a majority of the network nodes computes target load values of their cells in the same way according to the embodiments, each network node will be influenced by the entire network. However, the influence is scaled by a factor depending on the distance between the cells, which may be referred to as the hop distance.

Local Neighborhoods

Figure 2:
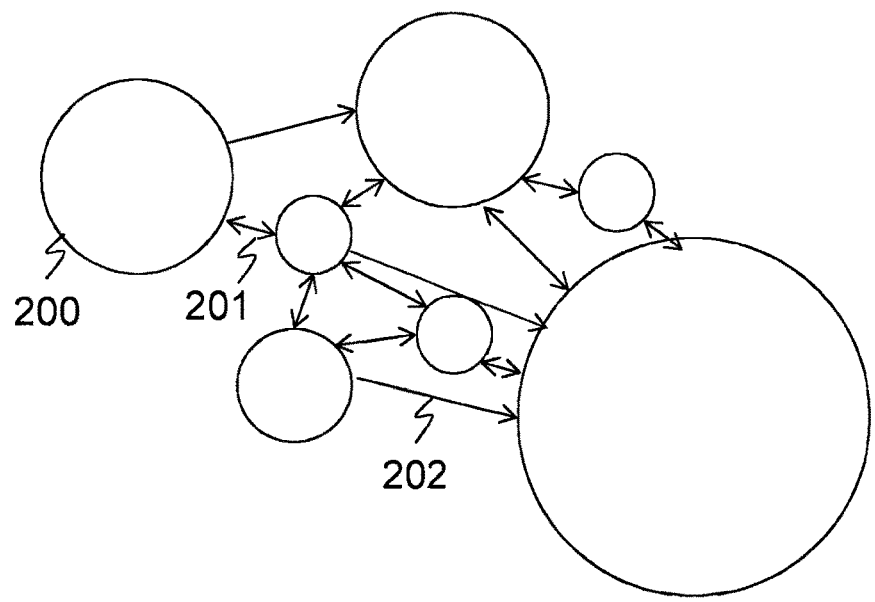
FIG. 2 is an example of a connectivity graph schematically illustrating neighbor relations between cells.

In one embodiment, each node maintains a list of neighbor cells for a served cell, herein called the local neighborhood of the served cell. This list may in embodiments be dynamically updated by estimating the probability of a handover to and from each neighbor cell and by selecting the most likely source and target neighbor cells. The handover probability estimation can e.g. be based on a discrete Bayesian estimation scheme based on handover events. However, any mechanism to maintain the list of neighbor cells may be used. FIG. 2 is an example of a connectivity graph illustrating neighbor relations 201, 202, between cells 200. Some of the relations are mutually dependent 201 while others 202 are one-way relations. This is illustrated by the two-way and one-way arrows respectively between the cells 200.

Target Load Update

The update procedure for updating a single cell's target load value is described hereinafter. To achieve some of the advantages described previously it is assumed that the procedure is performed in each node and for each cell of the whole network or in a defined part of the network. The update procedure may be triggered as soon as a sufficiently large change of an estimated value of the current load for a cell is detected, as described hereinafter, or by a load balancing scheme invoked on the same criteria. Note that non-participating network nodes, such as network nodes not participating in the load redistribution due to lack of support for the functionality, can be accommodated by discounting them in the calculations of target load values.

Whenever a network node serving a cell i detects a sufficiently large change in the current load value estimate $l_i$ of the cell i, the node executes the following procedure:

Retrieve, for each neighbor cell j in the neighborhood $g_i$ the respective neighbor cell's current target load value $t_j$.

Set the target load value $t_i$ of cell i to the average of the cell's current load value $l_i$ and the target load values retrieved from the neighborhood $g_i$. The calculated average thus involves the current load value of the cell i, but the target load values of the cells in the neighborhood $g_i$:

$$t_i = \frac{1}{1+|g_i|}\left(l_i + \sum_{j=1}^{|g_i|} t_j\right) \quad [1]$$

Other functions than the average function may be possible to use when determining the target load value. Since all the network nodes serving cells in the neighborhood $g_i$ would calculate their cells' target load values in the same way, possibly using cell is target load value as input, the network nodes serving the cells in $g_i$ are requested to recalculate the target load values of their cells using their local neighborhoods, which may or may not include cell i. Once this calculation is complete, the network node recalculates cell is target load value $t_i$, using the updated target load values of the nodes serving the neighbor cells of the neighborhood $g_i$, and iterates this procedure. The iteration may be continued until a difference between two successive calculations of $t_i$ diminishes under a given threshold. Such iteration will terminate if the loads and the local neighborhood remain stable during the iteration. If this is not the case, the number of iterations may be limited by a fixed maximum amount of iterations. The requests for updated target load values from neighbor cells and their responses are messages that need to be passed between the nodes via some node-to-node interface when implemented in this completely distributed fashion. In an LTE implementation this could be achieved via the eNodeBs responsible for the individual cells e.g. through the X2 interface, or via MMEs through the S1 interface.

When triggered to update a target load value for a served cell, a network node first performs a local adjustment based on an estimate of the cells current load e.g. in terms of a running mean of the radio bandwidth usage. It then iterates over the cells neighborhood, requesting an updated target load value for each neighbor cell. Assuming that the local target load value adjustment is atomic, the original network node then again updates the target load value of its cell. If the new target load value differs sufficiently from the previous one, the procedure is repeated until a neighborhood wide equilibrium or a maximum number of iterations is reached.

Load Balancing or Load Redistribution

In embodiments of the invention, the updated target load values are used to redistribute load between the cells. A load distribution represented by the target load values of the different cells is the goal, so the action or mechanism used to redistribute or balance load should strive towards such a load distribution. In one embodiment of the invention, the mechanism used to redistribute load between the cells of the system assigns range expansion offsets to each cell. In other embodiments, the mechanism used to redistribute load may be based on tuning of downlink transmission power or of antenna beam forming parameters.

One way to redistribute the load of the network towards the load distribution represented by the target loads calculated as described previously, is to assign to each cell i a range expansion offset parameter $o_i$ in a suitable range. In one example, the range is [0 . . . 9]dB. The goal of the assignment of the range expansion offset parameter is to maximize the likelihood to achieve the target load $t_i$. For each cell i, the minimum $\check{d}$ and maximum $\hat{d}$ target load-to-load differences $t_k-l_k$ is calculated for $$k \in \{i\} \cup g_i$$

This gives a range of differences $[\check{d}, \hat{d}]$ in the neighborhood of cell i. The range of differences may be used to scale a corresponding local difference $t_i-l_i$ using the following equation:

$$o_i = \frac{p_i - l_i}{\hat{d} - \check{d}} 9 \text{ dB} \quad [2]$$

Thus, in one embodiment two temporary variables max and min are initialized to be the local difference between the target and the actual or current load value for the cell±a damping parameter $\epsilon$. The network node iterates over the cell's neighborhood and updates the max and min variables. The max and min values obtained after the iteration are then used to scale the local target load-to-load difference linearly to a value in the chosen range for the range expansion offset parameter. Again the damping parameter $\epsilon$ is used to damp large swings in the range expansion offset parameter as actual loads approach targets. Adapting this embodiment to using pairwise offsets is a straightforward generalization.

The advantage is that the entire range of offsets available locally is used.

However, this tends to give large swings when the maximum difference in the neighborhood approaches zero. Such large swings may be reduced by using the cutoff damping parameter $\epsilon$ on $\hat{d}-\check{d}$ beyond which it is avoided to reset the range expansion offset parameter. Alternative embodiments include scaling the difference non-linearly to the dB interval, or scaling quotas instead of differences.

The range expansion offset parameters of the cells in the neighborhood $g_i$ do not have to be recalculated, since they will be recalculated when their own load value is significantly changed. However, for the fastest possible load balancing effect, range expansion offset parameters of neighbor cells may also be recalculated to reflect the updated target loads in the neighborhood $g_i$ of the initiating cell.

In practice the load used in the calculations described here is also preferably estimated as an average over time scales from 0.1 to 60 seconds, which corresponds to low pass filtering of measurements done on the time scale of the radio frames (5 to 10 ms in LTE). It has also turned out to be useful to low pass filter both the target load values and the calculated range expansion offset parameters to produce an overall mechanism that converges to an equilibrium in between 15 and 300 seconds (for stable scenarios and a simulation of 2-20 node networks), and that does not significantly increase the number of handovers per time unit.

Experiments

In experiments performed, two high power nodes, also referred to as macro nodes with a maximum output power of (20 W), and seven low power nodes comprising three nano nodes (output power 5 W) and four pico nodes (output power 1 W) have been randomly placed within an area of 2.25 km$^2$. Throughout the area and its surroundings 1125 UEs have been distributed moving according to a mobility model based on Lévy walks and with network traffic patterns fitted to recorded traces.

Figure 3A:
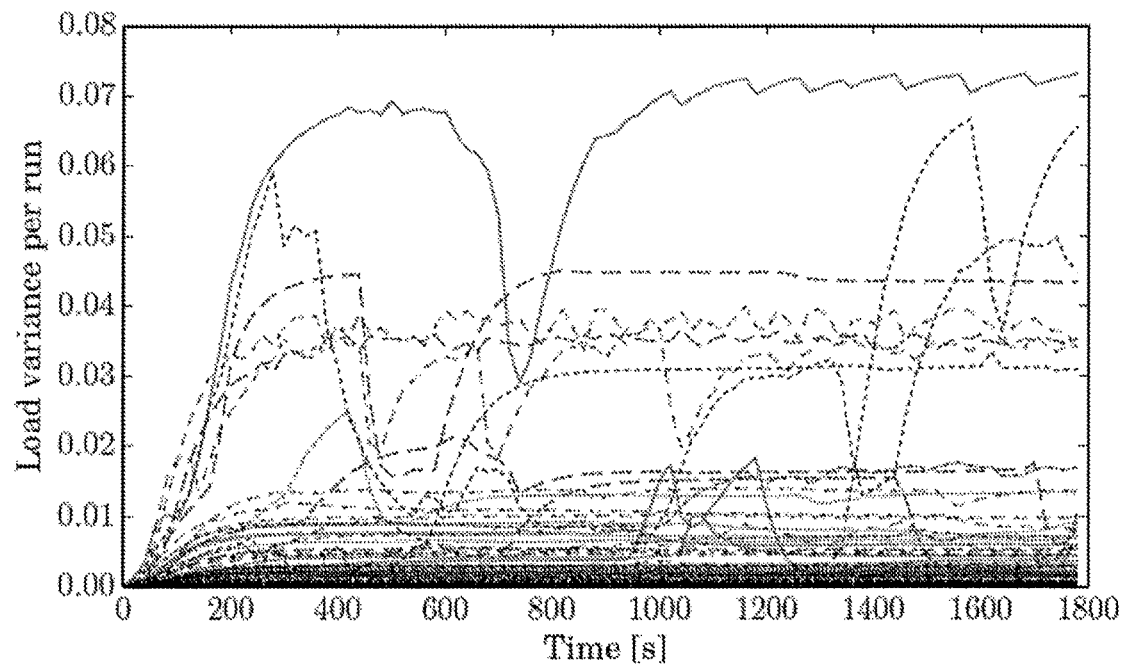
FIGS. 3a-b are graphs illustrating the load balance over time expressed in terms of the load variance over nodes with and without the use of the method according to embodiments.
Figure 3B:
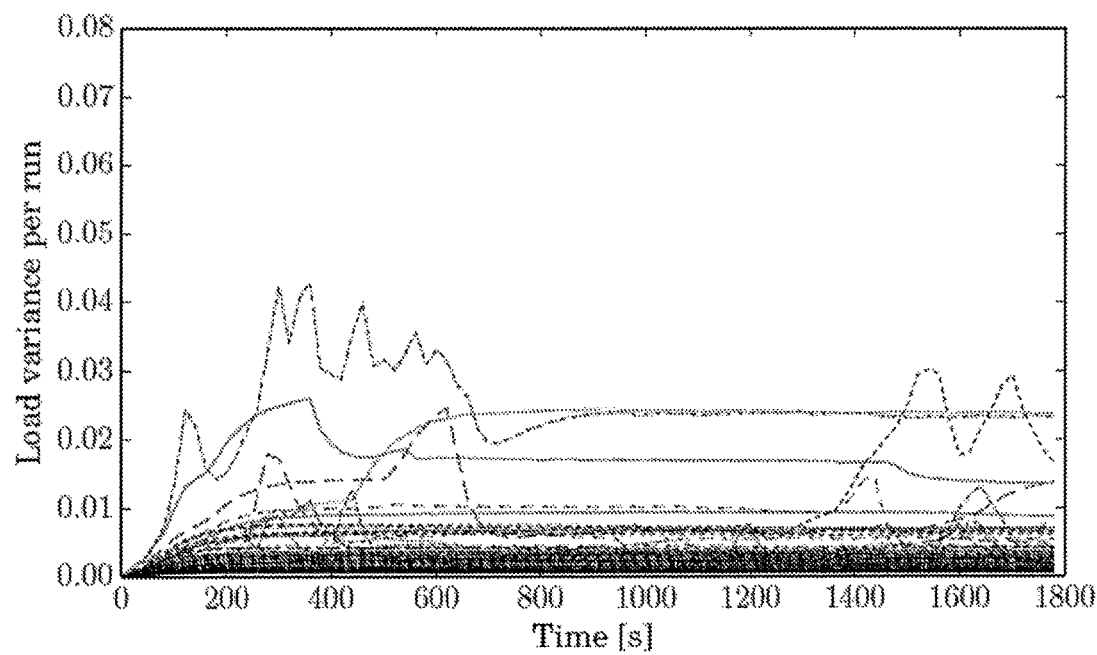
Figure 4:
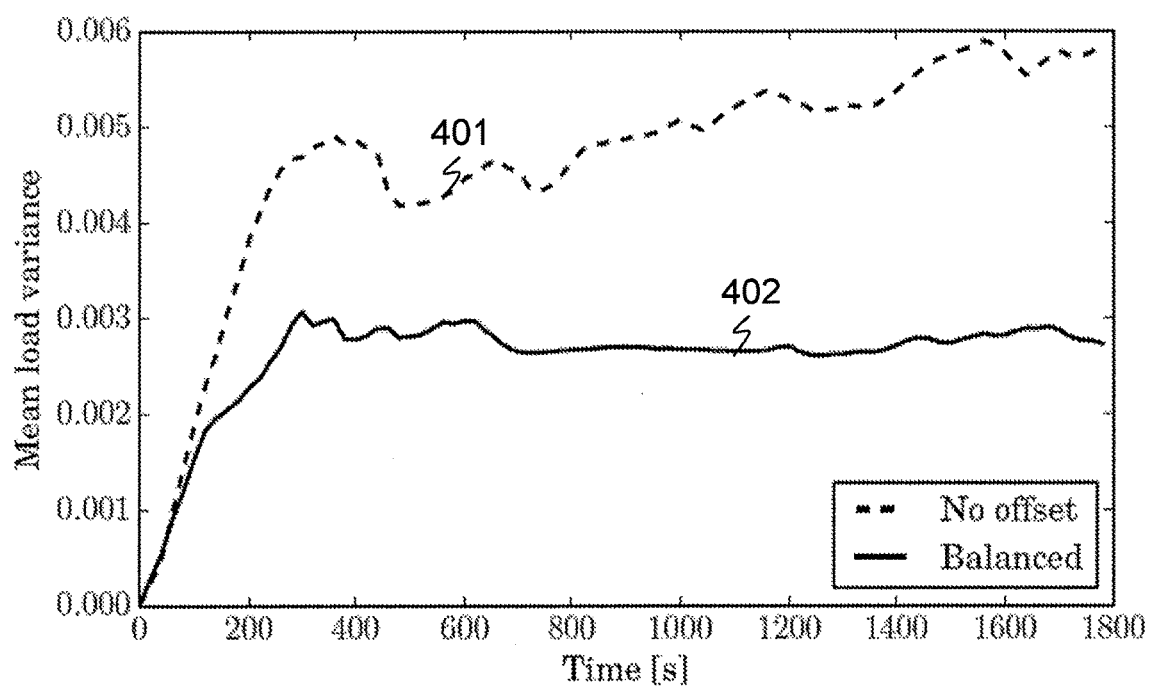
FIG. 4 is a graph summarizing the results in a plot of the average load variance for all experiments for the two cases in FIGS. 3a-b.

FIGS. 3a-b are graphs illustrating the load balance over time expressed in terms of the load variance over all the nodes during 30 minutes, for each of 100 independent runs or experiments with random node and UE start positions. The first graph in FIG. 3a shows load variances with the range expansion offset parameter set to 0, and the second graph in FIG. 3b shows load variances using a reference implementation of the proposed load balancing mechanism according to embodiments of the invention. The result is summarized in FIG. 4, which plots the average load variance for all 100 experiments for the two cases, one plot 401 illustrating the result without the load balancing according to embodiments of the invention, and the other plot 402 illustrating the result with the load balancing according to embodiments of the invention. This clearly shows the advantage in terms of improved load balancing of embodiments of the invention.

Methods and Apparatus

Figure 5A:
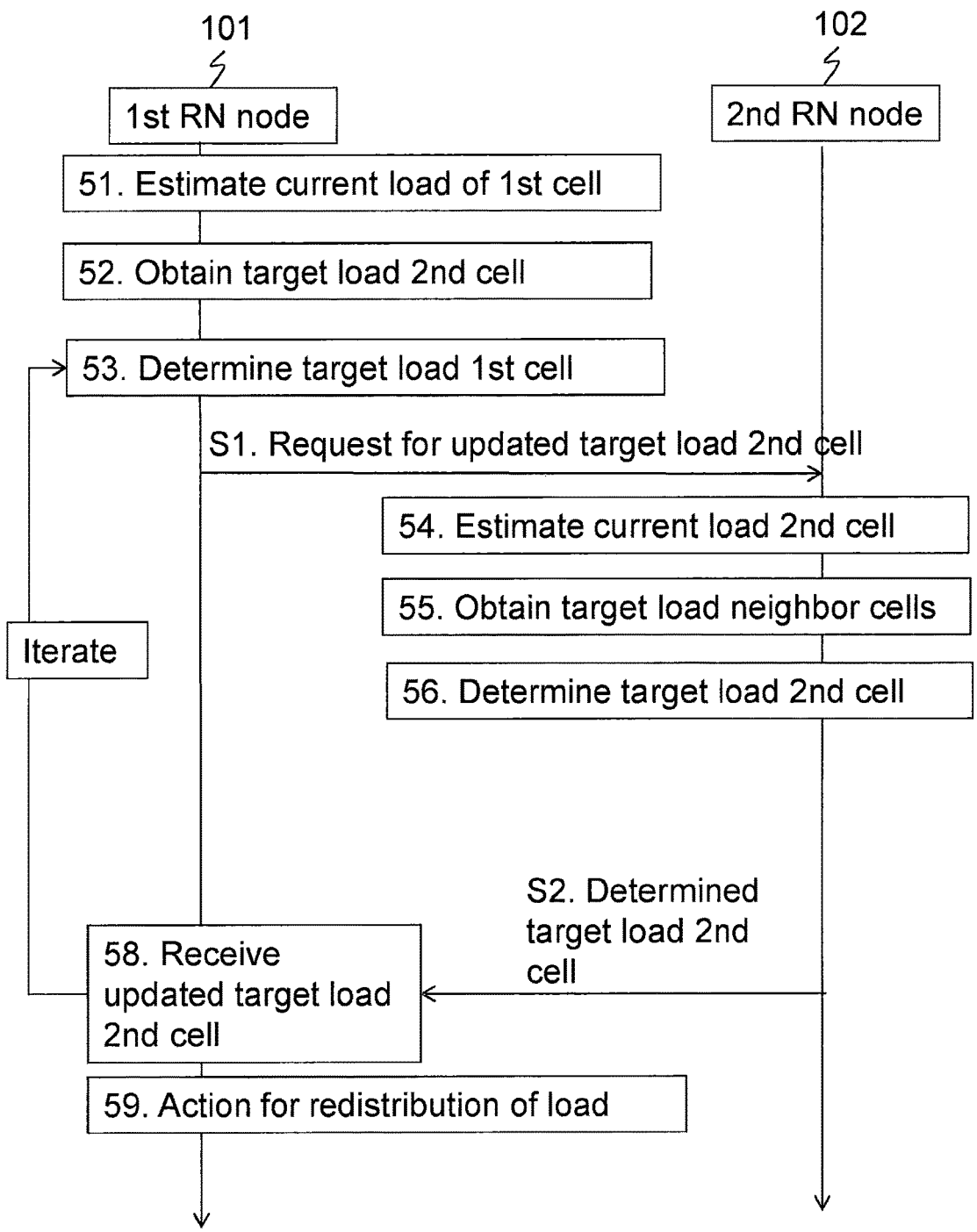
FIG. 5a is a signaling diagram illustrating the method in a first and second radio network node according to embodiments.

FIG. 5a is a signaling diagram illustrating embodiments of the invention according to a distributed scenario. A first radio network node (1$^{st}$ RN node) 101 serving a first cell 111 communicates with a second radio network node (2$^{nd}$ RN node) 102 serving a second cell 112. The first cell 111 has the second cell 112 in its neighbor cell list, and the second cell 112 thus belongs to the first cells 111 local neighborhood. The first and second RN nodes may be eNodeBs in an LTE network e.g. communicating with each other over the X2 interface. The first and second RN nodes may also be part of a same physical radio base station serving both the first cell 111 and the second cell 112. The first RN node 101 estimates 51 a value of a current load for the first cell 111. If this value of the current load differs substantially from an earlier estimate, this means that the load situation has changed and that a load redistribution may be needed. The first RN node 101 may therefore initiate an update of the target load value. The first RN node 101 obtains 52 the target load value for the second cell 112, and also for other neighbor cells in the neighbor cell list. This may be done by requesting and receiving the value from the second RN node 102 and from the other nodes serving the neighbor cells. The first RN node 101 determines 53 a value of the target load for the first cell 111 as a function of the value of the current load and the value of the target load for the second cell and for the other neighbor cells. In S1, the first RN node 101 transmits a request for an update of the value of the target load for the second cell 112 to the second RN node 102. This request triggers the determining of an updated target load value for the second cell 112 in the second RN node 102.

The second RN node 102 thus estimates 54 a value of a current load for the second cell 112, and obtains 55 a value of the target load for each cell in the local neighborhood of the second cell 112. The first cell 111 may be part of the local neighborhood of the second cell 112 if the neighbor relation between the two cells is mutually dependent (see explanation with reference to FIG. 2 above). The second RN node 102 then determines 56 a value of the target load for the second cell as a function of the value of the current load and the value of the target load for the cells in its local neighborhood, if any. The determined value of the target load for the second cell 112 is then in S2 transmitted to the first RN node 101.

When the first RN node 101 receives 58 the updated target load value of the second cell 112 that it has previously requested, the process of determining 53 the target load value for the first cell 111, and of requesting in S1 and receiving 58 the updated target load value for the second cell 112 is iterated until a halting criteria is met. The halting criteria may be that the updated target load value is stable, or that a maximum number of iterations have been met. With the so obtained target load value for the first cell 111, the first RN node 101 may initiate 59 an action for redistributing load between the first cell 111 and the second cell 112 towards a load distribution represented by the iterated determined value of the target load for the first cell 111 and the iterated received update of the value of the target load for the second cell 112. This may e.g. involve the tuning of the cell offset parameter for the first cell 111 as described above in section Load balancing or load redistribution.

Figure 5B:
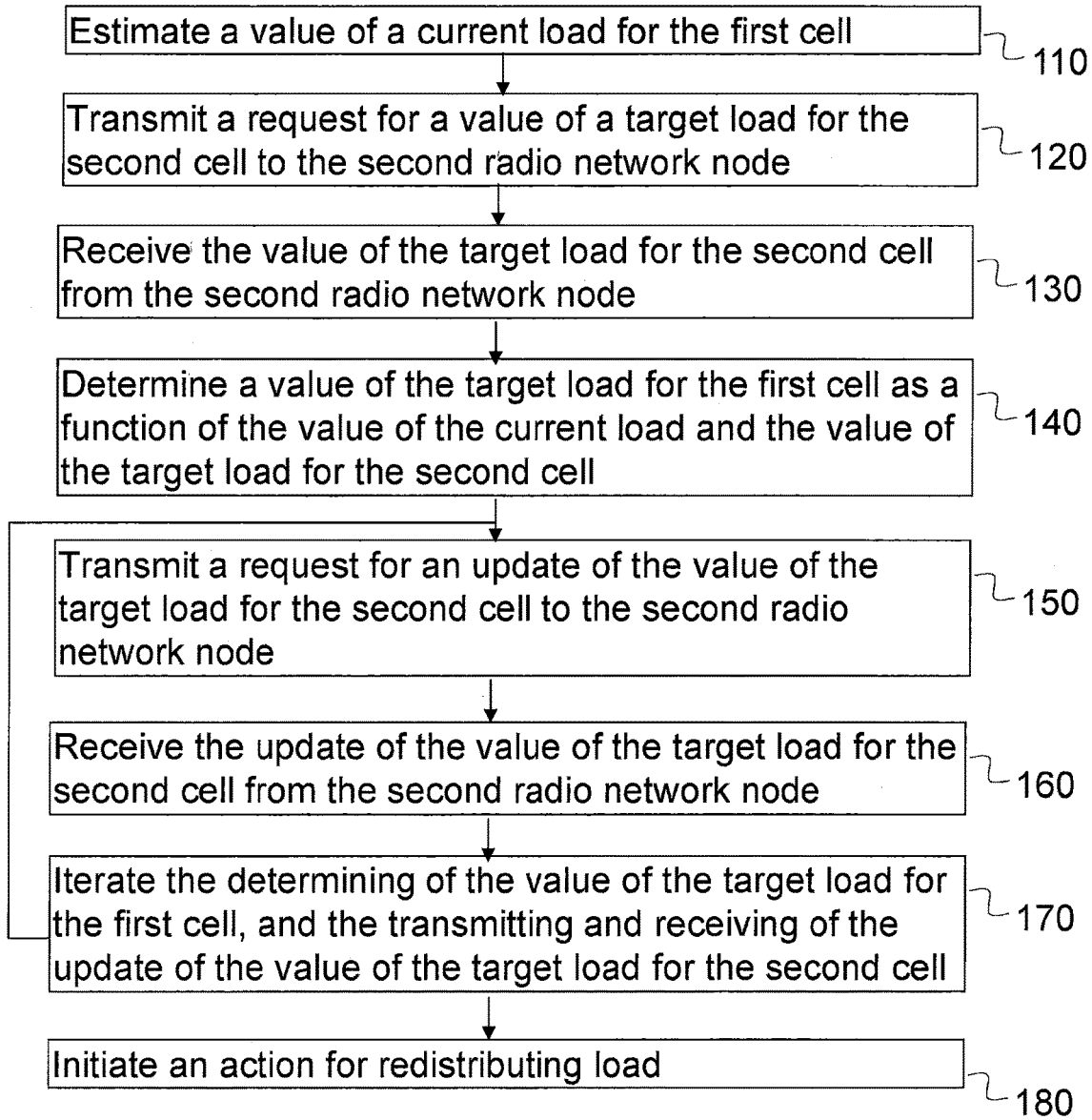
FIGS. 5b-c are flowcharts illustrating the method in the first and second radio network nodes respectively according to embodiments.

FIG. 5*b* is a flowchart illustrating an embodiment of a method performed in the first RN node 101 of a wireless communication network for enabling a redistribution of load between the first cell 111 served by the first radio network node 101 and the second cell 112 neighbor to the first cell 111. The second cell 112 is served by the second RN node 102 of the wireless communication network. The second cell may be chosen from a list of neighbor cells, where the list is dynamically updated based on handover statistics. In the following, the method is only described for one cell in the list of neighbor cells, although it may typically be performed for all neighbor cells in the list. The method comprises:

110: Estimating a value of a current load for the first cell 111. The current load value may e.g. be estimated as an average value, a median value, or any other percentile value for load values measured during a preceding time period.

120: Transmitting a request for a value of a target load for the second cell to the second RN node 102.

130: Receiving the value of the target load for the second cell from the second RN node 102.

140: Determining a value of the target load for the first cell as a function of the value of the current load and the value of the target load for the second cell. In one embodiment, the function is an average function, and the value of the target load for the first cell is determined as the average of the value of the current load and the value of the target load for the second cell.

150: Transmitting a request for an update of the value of the target load for the second cell to the second RN node 102. This request triggers a corresponding method, but without the iteration, in the second RN node 102, as described below with reference to FIG. 5*c*.

160: Receiving the update of the value of the target load for the second cell from the second RN node 102.

170: Iterating the determining 140 of the value of the target load for the first cell, and the transmitting 150 and receiving 160 of the update of the value of the target load for the second cell. The iterating may be stopped when a halting criteria has been met, e.g. when the difference between the determined values of the target load in two subsequent iterations is below a threshold value and thus has stabilized, or when the number of iterations has reached a maximum.

180: Initiating an action for redistributing load between the first cell and the second cell towards a load distribution represented by the iterated determined value of the target load for the first cell and the iterated received update of the value of the target load for the second cell. In one embodiment, the action for redistributing load may be the tuning of range expansion offset parameters for the first cell.

Figure 5C:
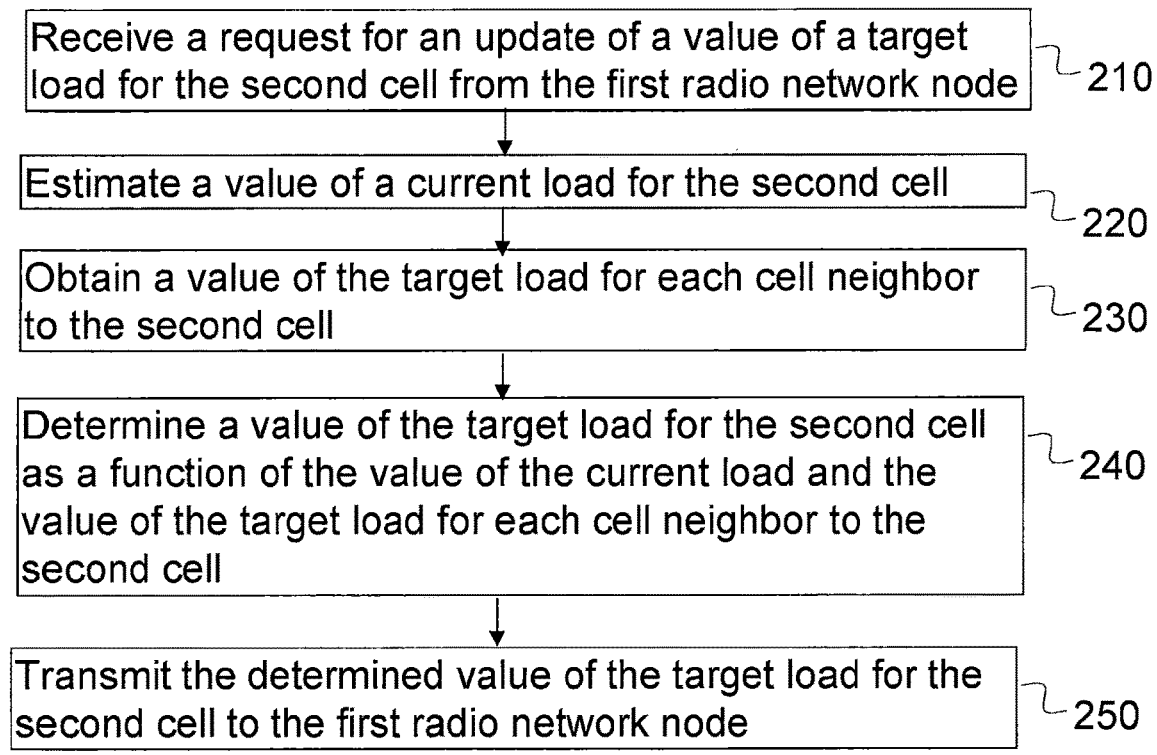

FIG. 5*c* is a flowchart illustrating an embodiment of the method performed in the second RN node 102 of the wireless communication network for enabling the redistribution of load between the first cell and the second cell. The method illustrated is thus the method in the second RN node 102 corresponding to the method in the first RN node 101 described above with reference to FIG. 5*b*, but without the iteration. The method may be performed for all neighbor cells in the neighborhood of the first cell, and not only for the second cell. In embodiments, a neighbor cell may be served by the RN node serving the first cell, i.e. the first RN node 101. The following method is then performed in the same RN node as the method described above with reference to FIG. 5*b*. The method comprises:

210: Receiving a request for an update of a value of a target load for the second cell from the first RN node 101. This corresponds to step 150 described above of transmitting the request performed in the first RN node 101.

In response to the received request, the method comprises:

220: Estimating a value of a current load for the second cell.

230: Obtaining a value of the target load for each cell neighbor to the second cell. The cells that are neighbor to the second cell have previously been referred to as the local neighborhood of the second cell. This local neighborhood may or may not comprise the first cell.

240: Determining a value of the target load for the second cell as a function—such as the average—of the value of the current load and the value of the target load for each cell neighbor to the second cell.

250: Transmitting the determined value of the target load for the second cell to the first RN node 101.

Figure 6:
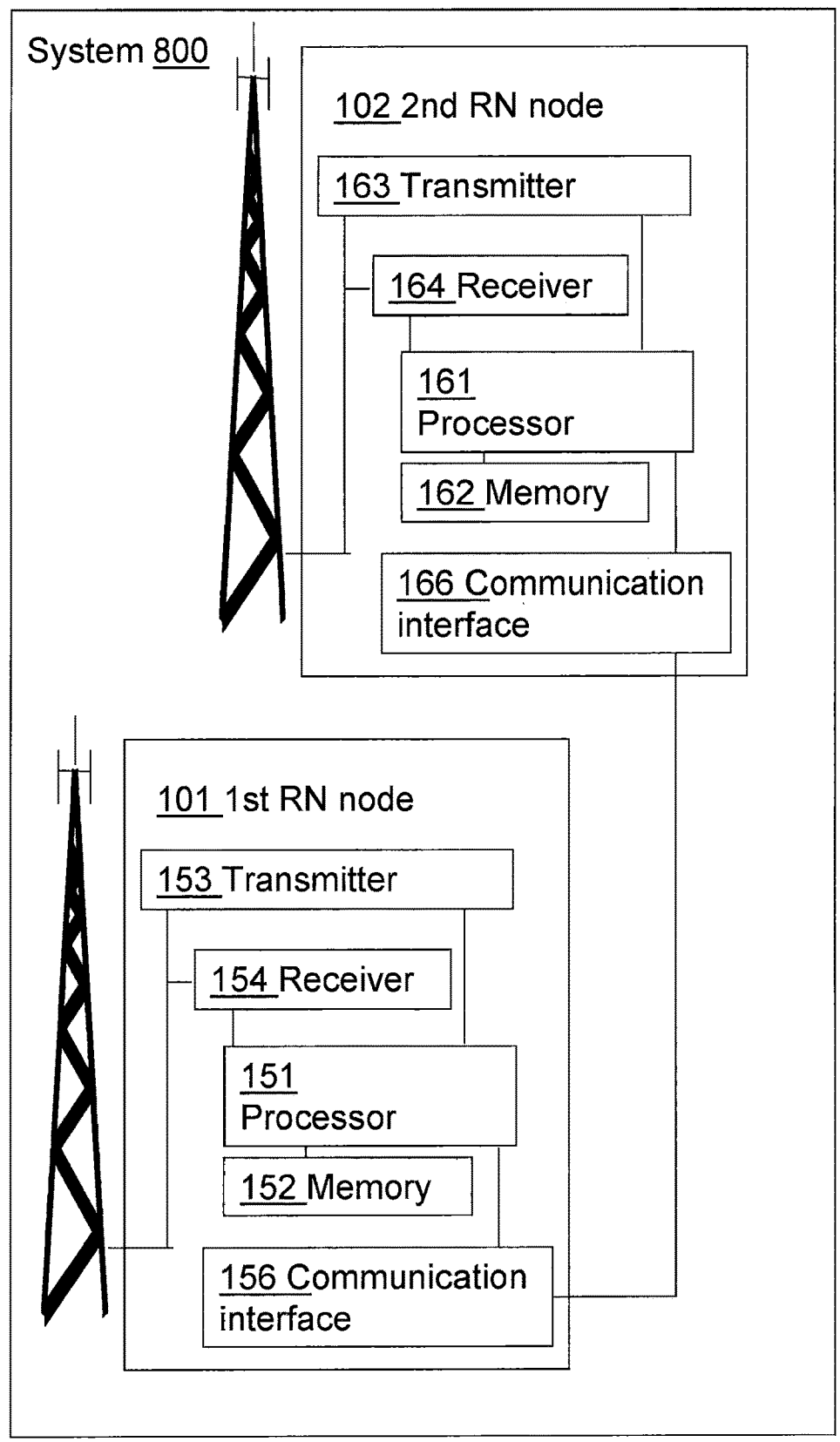
FIG. 6 is a block diagram schematically illustrating the distributed system comprising the first and second radio network nodes according to embodiments.

An embodiment of the first RN node 101 of the wireless communication network is schematically illustrated in the block diagram in FIG. 6. The first RN node 101 is configured to enable a redistribution of load between the first cell served by the first RN node 101 and the second cell neighbor to the first cell. The second cell is served by the second RN node 102 of the wireless communication network. The first RN node 101 is further configured to estimate a value of a current load for the first cell, and transmit a request for a value of a target load for the second cell to the second RN node 102. The first RN node 101 is further configured to receive the value of the target load for the second cell from the second RN node 102, and to determine a value of the target load for the first cell as a function of the value of the current load and the value of the target load for the second cell. The first RN node 101 is further configured to transmit a request for an update of the value of the target load for the second cell to the second RN node 102, and receive the update of the value of the target load for the second cell from the second RN node 102. The first RN node 101 is also further configured to iterate the determining of the value of the target load for the first cell, and the transmitting and receiving of the update of the value of the target load for the second cell, and to initiate an action for redistributing load between the first cell and the second cell towards a load distribution represented by the iterated determined value of the target load for the first cell and the iterated received update of the value of the target load for the second cell.

An embodiment of the second RN node 102 of the wireless communication network is also schematically illustrated in the block diagram in FIG. 6. The second RN node 102 is configured to enable a redistribution of load between the first and the second cell. The second RN node 102 is further configured to receive a request for an update of a value of a target load for the second cell from the first RN node 101. The second RN node 102 is further configured to, in response to the received request, estimate a value of a current load for the second cell, obtain a value of the target load for each cell neighbor to the second cell, and determine a value of the target load for the second cell as a function of the value of the current load and the value of the target load for each cell neighbor to the second cell. The second RN node 102 is further configured to transmit the determined value of the target load for the second cell to the first RN node 101.

In embodiments of the invention, the first RN node 101 may comprise a processor 151 and a memory 152. The first RN node 101 may also comprise a radio interface circuit connected to the processor 151 configured to communicate with wireless devices 103 in the first cell 111. The radio interface circuitry may correspond to a transmitter 153 and a receiver 154. The first RN node 101 may also comprise a communication interface 156 configured to communicate with the second RN node 102. The memory 152 may comprise instructions executable by the processor 151. The first RN node 101 may thereby be operative to estimate a value of a current load for the first cell, and transmit a request for a value of a target load for the second cell to the second RN node 102, via the communication interface 156. The first RN node 101 may also be operative to receive the value of the target load for the second cell from the second RN node 102 via the communication interface 156, determine a value of the target load for the first cell as a function of the value of the current load and the value of the target load for the second cell, and transmit a request for an update of the value of the target load for the second cell to the second RN node 102, via the communication interface 156. The first RN node 101 may further be operative to receive the update of the value of the target load for the second cell from the second RN node 102, via the communication interface 156, and iterate the determining of the value of the target load for the first cell, and the transmitting and receiving of the update of the value of the target load for the second cell. The first RN node 101 may also be operative to initiate an action for redistributing load between the first cell and the second cell towards a load distribution represented by the iterated determined value of the target load for the first cell and the iterated received update of the value of the target load for the second cell.

In embodiments of the invention, the second RN node 102 may comprise a processor 161 and a memory 162. The second RN node 102 may also comprise a radio interface circuit connected to the processor 161 configured to communicate with wireless devices in the second cell 112. The radio interface circuitry may correspond to a transmitter 163 and a receiver 164. The second RN node 102 may also comprise a communication interface 166 configured to communicate with the first RN node 101. The memory 162 may comprise instructions executable by the processor 161. The second RN node 102 may thereby be operative to receive a request for an update of a value of a target load for the second cell from the first RN node 101 via the communication interface 166. The second RN node 102 may be further operative to estimate a value of a current load for the second cell, obtain a value of the target load for each cell neighbor to the second cell, and determine a value of the target load for the second cell as a function of the value of the current load and the value of the target load for each cell neighbor to the second cell. The second RN node 102 may be further operative to transmit the determined value of the target load for the second cell to the first RN node 101.

In an alternative way to describe the embodiment in FIG. 6, the first RN node 101 comprises an estimating module adapted to estimate a value of a current load for the first cell, a first transmitting module adapted to transmit a request for a value of a target load for the second cell to the second RN node 102, a first receiving module adapted to receive the value of the target load for the second cell from the second RN node 102, a determining module adapted to determine a value of the target load for the first cell as a function of the value of the current load and the value of the target load for the second cell, a second transmitting module adapted to transmit a request for an update of the value of the target load for the second cell to the second RN node 102, a second receiving module adapted to receive the update of the value of the target load for the second cell from the second RN node 102, an iterating module adapted to iterate the determining of the value of the target load for the first cell, and the transmitting and receiving of the update of the value of the target load for the second cell, and an action initiating module adapted to initiate an action for redistributing load between the first cell and the second cell towards a load distribution represented by the iterated determined value of the target load for the first cell and the iterated received update of the value of the target load for the second cell. The second RN node 102 comprises a receiving module adapted to receive a request for an update of a value of a target load for the second cell from the first RN node 101, an estimating module adapted to estimate a value of a current load for the second cell, a first obtaining module adapted to obtain a value of the target load for each cell neighbor to the second cell, a determining module adapted to determine a value of the target load for the second cell as a function of the value of the current load and the value of the target load for each cell neighbor to the second cell, and a transmitting module adapted to transmit the determined value of the target load for the second cell to the first RN node 101.

The modules described above are functional units which may be implemented in hardware, software, firmware or any combination thereof. In one embodiment, the modules are implemented as a computer program running on a processor.

In an alternative way to describe the embodiment in FIG. 6, the first and second RN nodes 101, 102, each comprise a Central Processing Unit (CPU) which may be a single unit or a plurality of units. Furthermore, the first and second RN nodes 101, 102, each comprise at least one computer program product (CPP) in the form of a non-volatile memory, e.g. an EEPROM (Electrically Erasable Programmable Read-Only Memory), a flash memory or a disk drive. The CPP comprises a computer program, which comprises code means which when run on the first and second RN nodes 101, 102, causes the RN nodes 101, 102, to perform steps of the procedure described earlier in conjunction with FIGS. 5a-c.

Figure 7:
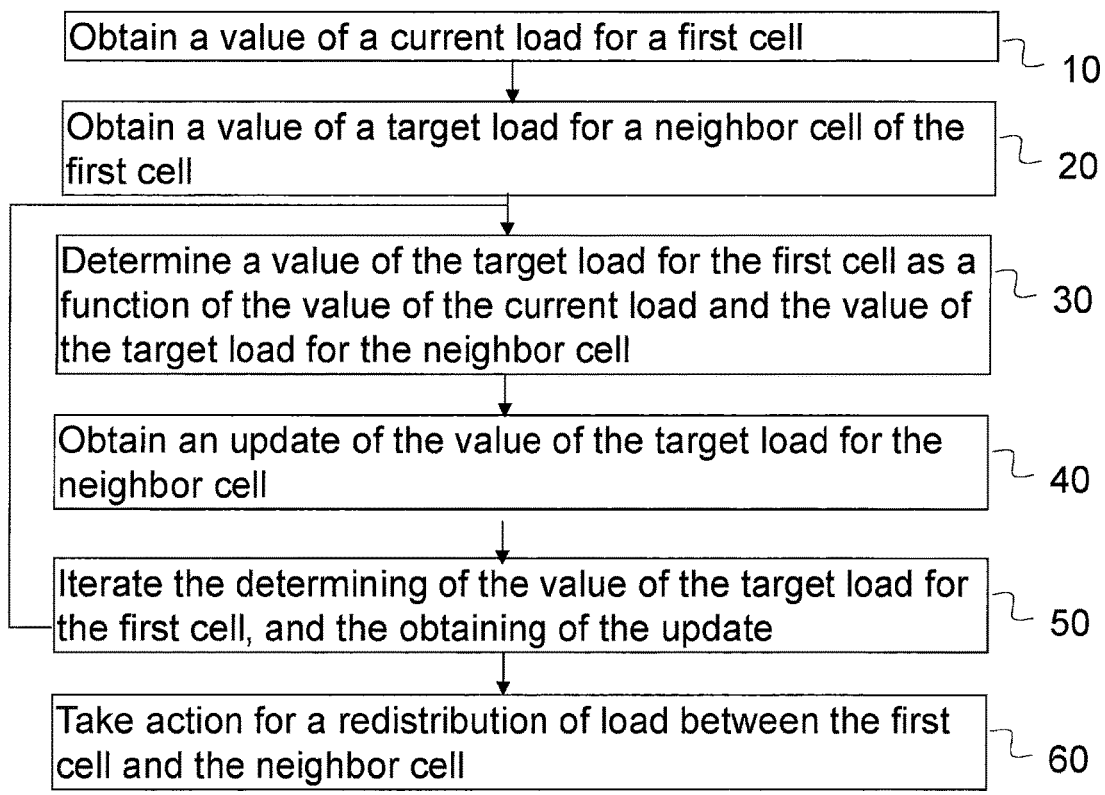
FIG. 7 is a flowchart illustrating the method in the system according to embodiments.

FIG. 7 is a flowchart illustrating one embodiment of a method performed in a system 800 of a wireless communication network for enabling a redistribution of load between cells of the wireless communication network. The method comprises:

10: Obtaining a value of a current load for a first cell.

20: Obtaining a value of a target load for a neighbor cell of the first cell.

30: Determining a value of the target load for the first cell as a function of the value of the current load and the value of the target load for the neighbor cell. The value of the target load for the first cell may be determined 30 as an average of the value of the current load and the value of the target load for the neighbor cell.

40: Obtaining an update of the value of the target load for the neighbor cell

50: Iterating the determining 30 of the value of the target load for the first cell, and the obtaining 40 of the update of the value of the target load for the neighbor cell. The iterating 50 may be stopped when at least one of the following conditions is fulfilled: the difference between the determined values of the target load in two subsequent iterations is below a threshold value; the number of iterations has reached a maximum.

60: Taking action for a redistribution of load between the first cell and the neighbor cell towards a load distribution represented by the iterated determined value of the target load for the first cell and the iterated obtained update of the value of the target load for the neighbor cell. Taking action for a redistribution may comprise taking action for a tuning of a range expansion offset parameter for the first cell. The tuning of the range expansion offset parameter for the first cell may be based on a difference between a value of the target load and a value of a current load for the first cell and the neighbor cell respectively, as described previously in section Load balancing or load redistribution.

The method may be triggered by a change of the value of the current load in the first cell, or by a time triggered mechanism.

In embodiments of the invention, the method may further comprise choosing the neighbor cell from a list of cells. The list of cells may comprise cells that belong to the first cells local neighborhood. The list of cells may be dynamically updated based on handover information such as handover statistics. The list of cells may comprise cells to which a wireless device in the first cell has performed a hand-over, and cells from which a wireless device has performed a hand-over to the first cell. The value of the target load may be obtained 20 for all neighbor cells in the list of cells. The value of the target load for the first cell may be determined 30 as a function of the value of the current load and the value of the target load for all neighbor cells in the list of cells respectively. As described above, the value of the target load for the first cell may be determined 30 as an average of the value of the current load and the value of the target load for all neighbor cells in the list of cells respectively, as given by equation [1]. The value of the target load may thus be obtained 40 for all neighbor cells in the list of cells.

In one embodiment corresponding to the completely distributed solution, the system comprises a first RN node 101 and a second RN node 102, as illustrated in FIG. 6. The first RN node 101 serves the first cell and communicates with the second RN node 102 serving the neighbor cell. Obtaining 10 the value of the current load comprises that the first RN node 101 estimates the value of the current load. Obtaining 20, 40, the value and the updated value of the target load for the neighbor cell comprises that the first RN node 101 requests and receives the value and the updated value of the target load from the second RN node 102. The determining 30, the iterating 50, and the taking action 60 are in this embodiment performed by the first RN node 101.

Figure 8:
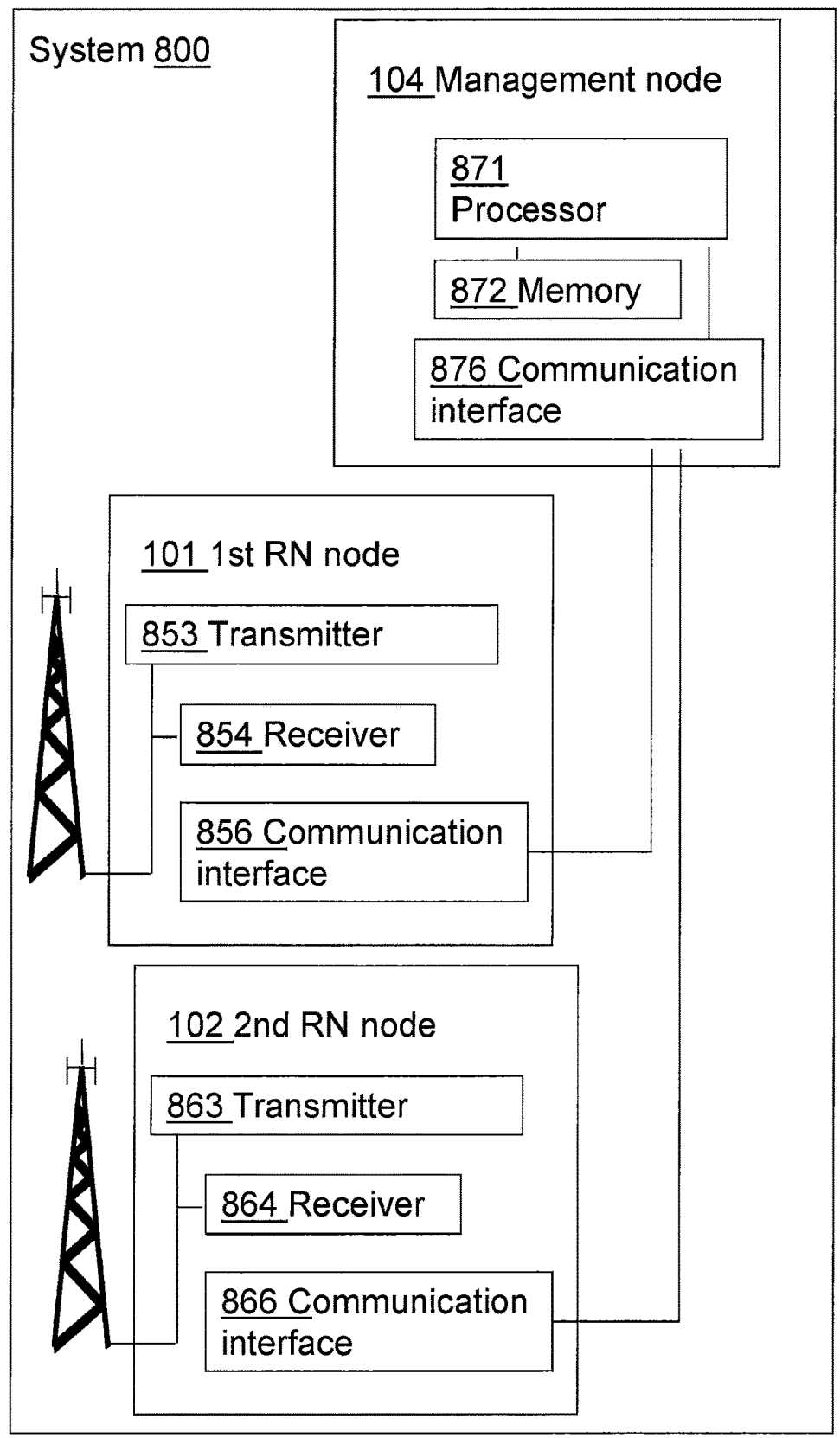
FIG. 8 is a block diagram schematically illustrating the system comprising a management node connected to the radio network nodes according to embodiments.

In another embodiment corresponding to a more centralized solution, the system 800 comprises a management node 104, such as an MME, connected to a first RN node 101 serving the first cell and to a second RN node 102 serving the neighbor cell, as illustrated in FIG. 8. Obtaining 10 the value of the current load comprises that the management node 104 receives the value of the current load from the first RN node 101. Obtaining 20, 40, the value and the updated value of the target load for the neighbor cell comprises that the management node 104 requests and receives the value of the target load from the second RN node 102. The determining 30, the iterating 50, and the taking action 60 are in this embodiment performed by the management node 104.

Figure 9:
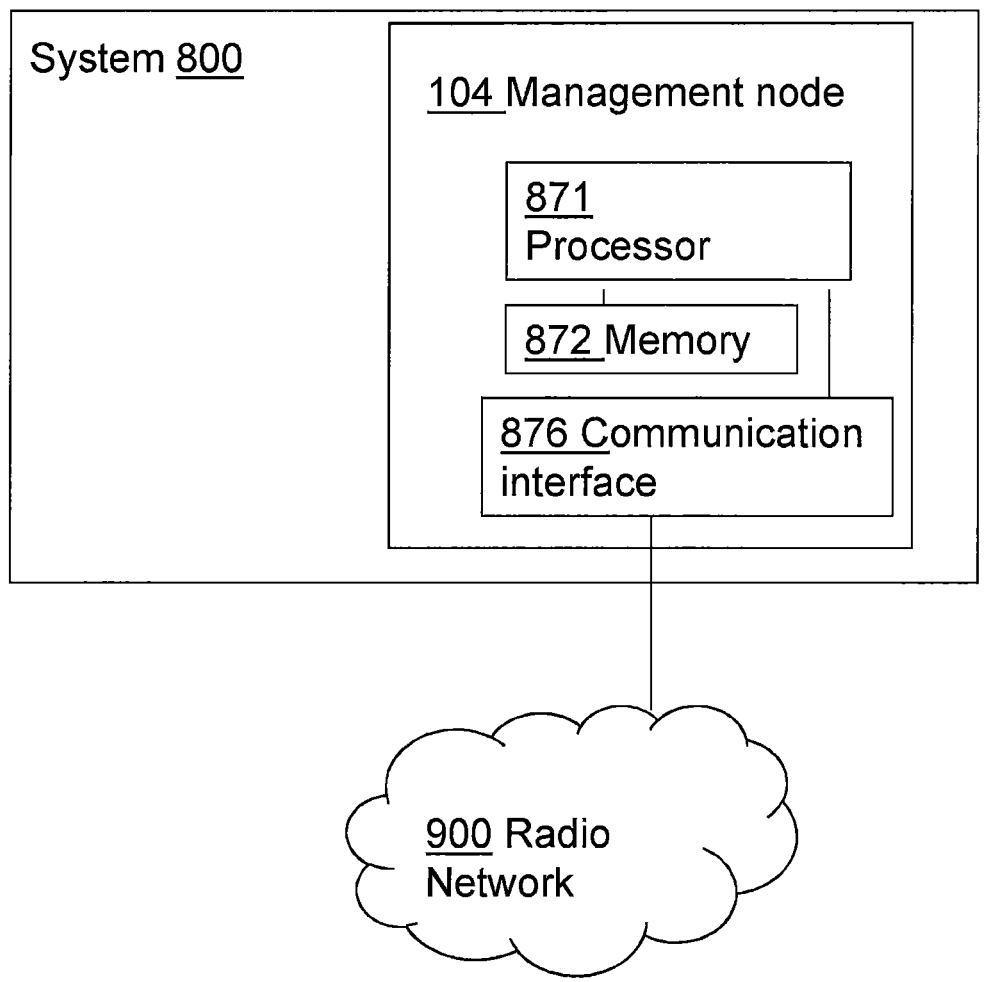
FIG. 9 is a block diagram schematically illustrating the system comprising a management node according to embodiments.

In still another embodiment, the system 800 comprises a management node 104 only. The system 800 may be connected to a radio network 900 comprising RN nodes serving the first and neighbor cells, as illustrated in FIG. 9. Obtaining 10 the value of the current load comprises that the management node 104 receives the value of the current load from the radio network 900. Obtaining 20, 40, the value and the updated value of the target load for the neighbor cell comprises that the management node 104 requests and receives the value of the target load from the radio network 900. The determining 30, the iterating 50, and the taking action 60 are performed by the management node 104.

In a further embodiment, the system 800 may comprise a first management node and a second management node. The first management node may be connected to the first RN node 101 and the second management node may be connected to the second RN node 102, the first and second radio network nodes serving the first cell and the neighbor cell respectively. Obtaining 10 the value of the current load comprises that the first management node obtains the value of the current load from the first RN node. Obtaining 20, 40, the value and the updated value of the target load for the neighbor cell comprises that the first management node requests and receives the value and the updated value of the target load from the second management node. The determining 30, the iterating 50, and the taking action 60 are in this embodiment performed by the first management node.

However, other embodiments corresponding to different degrees of centralization of the method may be envisaged.

Embodiments of the system 800 of the wireless communication network for enabling a redistribution of load between cells of the wireless communication network are schematically illustrated in the block diagrams in FIGS. 6, 8 and 9. The system is configured to obtain a value of a current load for a first cell, and obtain a value of a target load for a neighbor cell of the first cell. The system is further configured to determine a value of the target load for the first cell as a function of the value of the current load and the value of the target load for the neighbor cell. The system may be configured to determine the value of the target load for the first cell as an average of the value of the current load and the value of the target load for the neighbor cell. The system is further configured to obtain an update of the value of the target load for the neighbor cell, and iterate the determining of the value of the target load for the first cell, and the obtaining of the update. The system may be configured to stop the iterating when at least one of the following conditions is fulfilled: the difference between the determined values of the target load in two subsequent iterations is below a threshold value; a number of iterations has reached a maximum. The system is also configured to take action for a redistribution of load between the first cell and the neighbor cell towards a load distribution represented by the iterated determined value of the target load for the first cell and the iterated obtained update of the value of the target load for the neighbor cell. In one embodiment, the system is further configured to take action for the redistribution of load by taking action for a tuning of a range expansion offset parameter for the first cell. The tuning of the range expansion offset parameter for the first cell may be based on a difference between a value of the target load and a value of a current load for the first cell and the neighbor cell respectively.

The system may be further configured to choose the neighbor cell from a list of cells, wherein the list of cells is dynamically updated based on handover information, and comprises cells to which a wireless device in the first cell has performed a hand-over, and cells from which a wireless device has performed a hand-over to the first cell. In embodiments, the system may be configured to obtain the value of the target load for all neighbor cells in the list of cells, to determine the value of the target load for the first cell as a function of the value of the current load and the value of the target load for all neighbor cells in the list of cells respectively, and to obtain the value of the target load for all neighbor cells in the list of cells.

In the embodiment illustrated in FIG. 6, the system comprises a first RN node 101 configured to serve the first cell, and a second RN node 102 configured to serve the neighbor cell. The first RN node 101 is further configured to communicate with the second RN node 102. The first RN node 101 is configured to obtain the value of the current load by estimating the value of the current load, and to obtain the value of the target load for the neighbor cell by requesting and receiving the value of the target load from the second RN node 102. The first RN node 101 is further configured to determine a value of the target load for the first cell as a function of the value of the current load and the value of the target load for the neighbor cell, obtain the update of the value of the target load for the neighbor cell by requesting and receiving the update of the value of the target load from the second RN node 102, and iterate the determining of the value of the target load for the first cell, and the obtaining of the update. In this embodiment, the first RN node 101 is further configured to take action for a redistribution of load between the first cell and the neighbor cell towards a load distribution represented by the iterated determined value of the target load for the first cell and the iterated obtained update of the value of the target load for the neighbor cell.

In the embodiment illustrated in FIG. 8, the system 800 comprises a management node 104 connected to the first RN node 101 configured to serve the first cell and to the second RN node 102 configured to serve the neighbor cell. The management node 104 is configured to obtain the value of the current load by receiving the value of the current load from the first RN node 101, and obtain the value of the target load for the neighbor cell by requesting and receiving the value of the target load from the second RN node 102. The management node 104 is also configured to determine a value of the target load for the first cell as a function of the value of the current load and the value of the target load for the neighbor cell. The management node 104 is configured to obtain the update of the value of the target load for the neighbor cell by requesting and receiving the update of the value of the target load from the second RN node 102, and to iterate the determining of the value of the target load for the first cell, and the obtaining of the update. The management node 104 is also configured to take action for a redistribution of load between the first cell and the neighbor cell towards a load distribution represented by the iterated determined value of the target load for the first cell and the iterated obtained update of the value of the target load for the neighbor cell.

In the embodiment illustrated in FIG. 9, the system 800 comprises a management node 104. The system may be connected to the radio network 900 comprising the first and neighbor cells. However, the connection to the radio network 900 may be indirect, e.g. via another node of the wireless communication network such as another core network node. The management node 104 is configured to obtain the value of the current load by receiving the value of the current load from the radio network 900, and obtain the value of the target load for the neighbor cell by requesting and receiving the value of the target load from the radio network 900. The management node 104 is also configured to determine a value of the target load for the first cell as a function of the value of the current load and the value of the target load for the neighbor cell. The management node 104 is configured to obtain the update of the value of the target load for the neighbor cell by requesting and receiving the update of the value of the target load from the radio network 900, and to iterate the determining of the value of the target load for the first cell, and the obtaining of the update. The management node 104 is also configured to take action for a redistribution of load between the first cell and the neighbor cell towards a load distribution represented by the iterated determined value of the target load for the first cell and the iterated obtained update of the value of the target load for the neighbor cell.

In embodiments of the invention, the management node 104 may comprise a processor 871 and a memory 872. The management node 104 may also comprise a communication interface 876 configured to communicate with the radio network node 900, e.g. directly with the first and second RN nodes 101, 102. The memory 872 may comprise instructions executable by the processor 871. The management node 104 may thereby be operative to obtain a value of a current load for a first cell, and obtain a value of a target load for a neighbor cell of the first cell. The management node 104 may also be operative to determine a value of the target load for the first cell as a function of the value of the current load and the value of the target load for the neighbor cell, obtain an update of the value of the target load for the neighbor cell, and iterate the determining of the value of the target load for the first cell, and the obtaining of the update. The management node 104 may also be operative to take action for a redistribution of load between the first cell and the neighbor cell towards a load distribution represented by the iterated determined value of the target load for the first cell and the iterated obtained update of the value of the target load for the neighbor cell. The first and second RN nodes 101, 102, of system 800, also illustrated in FIG. 8, may also each comprise a communication interface 856, 866 for the communication with the management node 104, as well as a receiver 854, 864, each and a transmitter 853, 863, each for the communication with wireless devices 103 in the served cells.

In an alternative way to describe the embodiments of the system in FIGS. 6, 8 and 9, the system 800 comprises a Central Processing Unit (CPU) which may be a single unit or a plurality of units, e.g. placed in the first RN node 101 or in the management node 104. Furthermore, the system 800 comprises at least one computer program product (CPP) in the form of a computer readable medium or a non-volatile memory, e.g. an EEPROM (Electrically Erasable Programmable Read-Only Memory), a flash memory or a disk drive. The CPP comprises a computer program, comprising code means or computer readable code which when run on the system 800 causes the system 800 to perform steps of the procedure described earlier in conjunction with FIG. 7.

The above mentioned and described embodiments are only given as examples and should not be limiting. Other solutions, uses, objectives, and functions within the scope of the accompanying patent claims may be possible.

The invention claimed is:

1. A method performed in a system of a wireless communication network for enabling a redistribution of load between cells of the wireless communication network, the method comprising:
obtaining a value of a current load for a first cell,
obtaining a value of a target load for a neighbor cell of the first cell,
determining a value of the target load for the first cell as a function of the value of the current load and the value of the target load for the neighbor cell,
obtaining an update of the value of the target load for the neighbor cell,
iterating the determining of the value of the target load for the first cell, and the obtaining of the update of the value of the target load for the neighbor cell, and
taking action for a redistribution of load between the first cell and the neighbor cell towards a load distribution represented by the iterated determined value of the target load for the first cell and the iterated obtained update of the value of the target load for the neighbor cell.

2. The method according to claim 1, wherein taking action comprises:
taking action for a tuning of a range expansion offset parameter for the first cell.

3. The method according to claim 2, wherein the tuning of the range expansion offset parameter for the first cell is based on a difference between a value of the target load and a value of a current load for the first cell and the neighbor cell respectively.

4. The method according to claim 1, the method further comprising:
choosing the neighbor cell from a list of cells, wherein the list of cells is dynamically updated based on handover information, and comprises cells to which a wireless device in the first cell has performed a hand-over, and cells from which a wireless device has performed a hand-over to the first cell.

5. The method according to claim 4, wherein the value of the target load is obtained for all neighbor cells in the list of cells, wherein the value of the target load for the first cell is determined as a function of the value of the current load and the value of the target load for all neighbor cells in the list of cells respectively, and wherein the value of the target load is obtained for all neighbor cells in the list of cells.

6. The method according to claim 1, wherein the method is triggered by a change of the value of the current load in the first cell or by a time triggered mechanism.

7. The method according to claim 1, wherein the iterating is stopped when at least one of the following conditions is fulfilled: the difference between the determined values of the target load in two subsequent iterations is below a threshold value; a number of iterations has reached a maximum.

8. The method according to claim 1, wherein the value of the target load for the first cell is determined as an average of the value of the current load and the value of the target load for the neighbor cell.

9. The method according to claim 1, wherein the system comprises a first and a second radio network node, the first radio network node serving the first cell and communicating with the second radio network node serving the neighbor cell, and wherein obtaining the value of the current load comprises that the first radio network node estimates the value of the current load, wherein obtaining the value and the updated value of the target load for the neighbor cell comprises that the first radio network node requests and receives the value and the updated value of the target load from the second radio network node, and wherein the determining, the iterating, and the taking action is performed by the first radio network node.

10. The method according to claim 1, wherein the system comprises a management node connected to a first radio network node serving the first cell and to a second radio network node serving the neighbor cell, and wherein obtaining the value of the current load comprises that the management node receives the value of the current load from the first radio network node, and wherein obtaining the value and the updated value of the target load for the neighbor cell comprises that the management node requests and receives the value of the target load from the second radio network node, and wherein the determining, the iterating, and the taking action is performed by the management node.

11. A system of a wireless communication network for enabling a redistribution of load between cells of the wireless communication network, wherein the system is configured to:
obtain a value of a current load for a first cell,
obtain a value of a target load for a neighbor cell of the first cell,
determine a value of the target load for the first cell as a function of the value of the current load and the value of the target load for the neighbor cell,
obtain an update of the value of the target load for the neighbor cell,
iterate the determining of the value of the target load for the first cell, and the obtaining of the update, and
take action for a redistribution of load between the first cell and the neighbor cell towards a load distribution represented by the iterated determined value of the target load for the first cell and the iterated obtained update of the value of the target load for the neighbor cell.

12. The system according to claim 11, further configured to take action for the redistribution of load by taking action for a tuning of a range expansion offset parameter for the first cell.

13. The system according to claim 12, wherein the tuning of the range expansion offset parameter for the first cell is based on a difference between a value of the target load and a value of a current load for the first cell and the neighbor cell respectively.

14. The system according to claim 11, further configured to:
choose the neighbor cell from a list of cells, wherein the list of cells is dynamically updated based on handover information, and comprises cells to which a wireless device in the first cell has performed a hand-over, and cells from which a wireless device has performed a hand-over to the first cell.

15. The system according to claim 14, further configured to obtain the value of the target load for all neighbor cells in the list of cells, to determine the value of the target load for the first cell as a function of the value of the current load and the value of the target load for all neighbor cells in the list of cells respectively, and to obtain the value of the target load for all neighbor cells in the list of cells.

16. The system according to claim 11, further configured to stop the iterating when at least one of the following conditions is fulfilled: the difference between the determined values of the target load in two subsequent iterations is below a threshold value; a number of iterations has reached a maximum.

17. The system according to claim 11, further configured to determine the value of the target load for the first cell as an average of the value of the current load and the value of the target load for the neighbor cell.

18. The system according to claim 11, wherein the system comprises a first radio network node configured to serve the first cell, and a second radio network node configured to serve the neighbor cell, the first radio network node being further configured to communicate with the second radio network node, and wherein the first radio network node is further configured to:
obtain the value of the current load by estimating the value of the current load,
obtain the value of the target load for the neighbor cell by requesting and receiving the value of the target load from the second radio network node,
determine a value of the target load for the first cell as a function of the value of the current load and the value of the target load for the neighbor cell,
obtain the update of the value of the target load for the neighbor cell by requesting and receiving the update of the value of the target load from the second radio network node,
iterate the determining of the value of the target load for the first cell, and the obtaining of the update, and
take action for a redistribution of load between the first cell and the neighbor cell towards a load distribution represented by the iterated determined value of the target load for the first cell and the iterated obtained update of the value of the target load for the neighbor cell.

19. The system according to claim 11, wherein the system comprises a management node connected to a first radio network node configured to serve the first cell and to a second radio network node configured to serve the neighbor cell, the management node being configured to:
obtain the value of the current load by receiving the value of the current load from the first radio network node,
obtain the value of the target load for the neighbor cell by requesting and receiving the value of the target load from the second radio network node,
determine a value of the target load for the first cell as a function of the value of the current load and the value of the target load for the neighbor cell,
obtain the update of the value of the target load for the neighbor cell by requesting and receiving the update of the value of the target load from the second radio network node,
iterate the determining of the value of the target load for the first cell, and the obtaining of the update, and
take action for a redistribution of load between the first cell and the neighbor cell towards a load distribution represented by the iterated determined value of the target load for the first cell and the iterated obtained update of the value of the target load for the neighbor cell.

20. A method performed in a first radio network node of a wireless communication network for enabling a redistribution of load between a first cell served by the first radio network node and a second cell neighbor to the first cell, wherein the second cell is served by a second radio network node of the wireless communication network, the method comprising:
estimating a value of a current load for the first cell,
transmitting a request for a value of a target load for the second cell to the second radio network node,
receiving the value of the target load for the second cell from the second radio network node,
determining a value of the target load for the first cell as a function of the value of the current load and the value of the target load for the second cell,
transmitting a request for an update of the value of the target load for the second cell to the second radio network node,
receiving the update of the value of the target load for the second cell from the second radio network node,
iterating the determining of the value of the target load for the first cell, and the transmitting and receiving of the update of the value of the target load for the second cell, and
initiating an action for redistributing load between the first cell and the second cell towards a load distribution represented by the iterated determined value of the target load for the first cell and the iterated received update of the value of the target load for the second cell.

21. A method performed in a second radio network node of a wireless communication network for enabling a redistribution of load between a first cell served by a first radio network node of the wireless communication network and a second cell neighbor to the first cell, wherein the second cell is served by the second radio network node, the method comprising:
receiving a request for an update of a value of a target load for the second cell from the first radio network node, and in response to the received request, the method comprising:
estimating a value of a current load for the second cell,
obtaining a value of the target load for each cell neighbor to the second cell, determining a value of the target load for the second cell as a function of the value of the current load and the value of the target load for each cell neighbor to the second cell, and transmitting the determined value of the target load for the second cell to the first radio network node.

22. A first radio network node of a wireless communication network, the first radio network node being configured to enable a redistribution of load between a first cell served by the first radio network node and a second cell neighbor to the first cell, wherein the second cell is served by a second radio network node of the wireless communication network, wherein the first radio network node is further configured to:

estimate a value of a current load for the first cell, transmit a request for a value of a target load for the second cell to the second radio network node, receive the value of the target load for the second cell from the second radio network node, determine a value of the target load for the first cell as a function of the value of the current load and the value of the target load for the second cell, transmit a request for an update of the value of the target load for the second cell to the second radio network node, receive the update of the value of the target load for the second cell from the second radio network node, iterate the determining of the value of the target load for the first cell, and the transmitting and receiving of the update of the value of the target load for the second cell, and initiate an action for redistributing load between the first cell and the second cell towards a load distribution represented by the iterated determined value of the target load for the first cell and the iterated received update of the value of the target load for the second cell.

23. A second radio network node of a wireless communication network, the second radio network node being configured to enable a redistribution of load between a first cell served by a first radio network node of the wireless communication network and a second cell neighbor to the first cell, wherein the second cell is served by the second radio network node, the second radio network node being further configured to:

receive a request for an update of a value of a target load for the second cell from the first radio network node, and in response to the received request:

estimate a value of a current load for the second cell, obtain a value of the target load for each cell neighbor to the second cell, determine a value of the target load for the second cell as a function of the value of the current load and the value of the target load for each cell neighbor to the second cell, and transmit the determined value of the target load for the second cell to the first radio network node.

24. A computer program product comprising a non-transitory computer readable storage medium storing code which when run on a processor of a system causes the system to perform a method as claimed claim 1.

\* \* \* \* \*